(12) United States Patent
Gah et al.

(10) Patent No.: US 11,793,223 B2
(45) Date of Patent: Oct. 24, 2023

(54) ANTIOXIDANT COMPOSITION

(71) Applicant: Conopco Inc., Englewood Cliffs, NJ (US)

(72) Inventors: Carmen Isabella Gah, Heilbronn (DE); Volker Jonas, Heilbronn (DE); Martin Helmut Spraul, Bad Wimpfen (DE)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

(21) Appl. No.: 16/978,204

(22) PCT Filed: Mar. 6, 2019

(86) PCT No.: PCT/EP2019/055560
§ 371 (c)(1),
(2) Date: Sep. 4, 2020

(87) PCT Pub. No.: WO2019/170737
PCT Pub. Date: Sep. 12, 2019

(65) Prior Publication Data
US 2021/0037869 A1    Feb. 11, 2021

(30) Foreign Application Priority Data

Mar. 9, 2018 (EP) .................................... 19161025

(51) Int. Cl.
| A23L 33/105 | (2016.01) |
| A23L 27/60 | (2016.01) |
| A23L 27/10 | (2016.01) |
| A23L 3/3472 | (2006.01) |

(52) U.S. Cl.
CPC ........... *A23L 33/105* (2016.08); *A23L 3/3472* (2013.01); *A23L 27/10* (2016.08); *A23L 27/60* (2016.08)

(58) Field of Classification Search
CPC ........ A23L 33/105; A23L 27/60; A23L 27/10; A23L 3/3472
USPC ....................................................... 426/602
See application file for complete search history.

(56) References Cited

U.S. PATENT DOCUMENTS

| 5,230,915 A | 7/1993 | Shahidi Fereidoon | |
| 5,585,130 A * | 12/1996 | Aeschbach | A23L 3/3472 |
| | | | 426/541 |
| 2003/0180424 A1 | 9/2003 | Friedman et al. | |
| 2007/0104809 A1 | 5/2007 | Coyne et al. | |

FOREIGN PATENT DOCUMENTS

| CN | 106417561 | 2/2017 | |
| CN | 106615038 | 5/2017 | |
| EP | 0454097 | 10/1991 | |
| JP | 409009921 | 1/1997 | |
| JP | H099921 | 1/1997 | |
| JP | H099921 A * | 1/1997 | |
| JP | 2903318 | 6/1999 | |
| JP | 2002272159 | 9/2002 | |
| JP | 2003102444 | 4/2003 | |
| JP | 2015039311 | 3/2015 | |
| RU | 2464815 | 10/2012 | |
| WO | WO0207536 | 1/2002 | |
| WO | WO2006138349 | 12/2006 | |
| WO | WO2012103637 | 8/2012 | |
| WO | WO15159841 | 10/2015 | |
| WO | 2017220511 | 12/2017 | |
| WO | WO-2017220511 A1 * | 12/2017 | ........... C11B 5/0085 |
| WO | WO2019115761 | 6/2019 | |

OTHER PUBLICATIONS

Translation of JP-H099921-A. (Year: 1997).*
Yanishlieva N V et al.; Natural Antioxidants from Herbs and Spices; European Journal of Lipid Science and Technology; Jan. 1, 2006; pp. 776-793; vol. 108.
Bracco, U. et al.; Production of Use of Natural Antioxidants; Journal of the American Oil Chemists' Society (JAOCS);Jan. 1, 1981; Att docket No. F70122WO; 58; Journal of the American Oil Chemsts' Society (JAOCS), Springer, De.
D. Hadziyevl. Steele; Dehydrated Mashed Potatoes—Chemical and Biochemical; Advances in Food Research; Jan. 1, 1979; 25; Academic Press; Canada.
E.N. Frankel; Lipid Oxidation E.N. Frankel vol. 19 p. 1-22; 1980; 1-22.
M.S. Brewer: "Natural Antioxidants: Sources, Compounds, Mechanisms of Action, and Potential Applications", Comprehensive Reviews in Food Science and Food Safety, vol. 10, No. 4, Jul. 1, 2011 (Jul. 1, 2011), pp. 221-247.
Yanishlieva N V et al: "Natural Antioxidants From Herbs and Spices", European Journal of Lipid Science and Technology, Wiley VCH Verlag, Weinheim, DE, vol. 108, Jan. 1, 2006 (Jan. 1, 2006), pp. 776-793.
Ruiz;Ziderberg-Cherr; .; Nutrition and Health Info Sheet Fat; 2016; 8.

(Continued)

Primary Examiner — Brent T O'Hern
(74) Attorney, Agent, or Firm — N.V. Nederlandsch Octrooibureau

(57) ABSTRACT

The present invention relates to compositions with antioxidant properties, in particular for use in food or as food. In a first aspect the invention provides a composition comprising ginger powder, sage powder, and rosemary powder; wherein the particles of the ginger powder have a size of less than 800 μm, and the sage powder and rosemary powder have a size of less than 500 μm; and wherein the ginger powder (G), the sage powder (S), and the rosemary powder (R) are present in a weight ratio of G:S:R=1 to 4:1 to 3:1 to 3.
The invention also relates to a method for improving the oxidative stability of a food composition and to use of a combination of ginger powder, sage powder, and rosemary powder as an antioxidant, wherein the particles of the ginger powder have a size of less than 800 μm, and the sage powder and rosemary powder have a size of less than 500 μm; and wherein the ginger powder (G), the sage powder (S), and the rosemary powder (R) are present in a weight ratio of G:S:R=1 to 4:1 to 3:1 to 3.

12 Claims, No Drawings

(56) References Cited

OTHER PUBLICATIONS

Synthesis and Characterization of Allyl Fatty Acide Derivatives as Reactive Coalescing Agents for Latexes; Jul. 21, 2012; 2215-2226; 89.
Redono—Cuevas, L., Castellano, G. and Raikos, V., 2017, Natural antioxidants from herbs and spices improve the oxidative stability and frying performance of vegetable oils. International Journal of Food Sscience & Technology, 52(11), pp. 2422-2428, "abstract only".
Xie Review Article A review on rosemary as a natural antioxidation solution Eur J Lipid Sci Tech p1-10 2017; 2017; 1-10.
Aziz Critical Review in Food Science and Nutrition Natural Microbial Agents in Meat and Poultry Products V58 No. 3 p. 486-511 2018; 2018; 486-511; 58.

* cited by examiner

ANTIOXIDANT COMPOSITION

FIELD OF THE INVENTION

The present invention relates to a composition comprising ginger powder, sage powder, and rosemary powder. In particular, the invention relates such a composition as an antioxidant composition or as a food composition. The invention also relates to a method for improving the oxidative stability of a food composition and to use of a combination of ginger powder, sage powder, and rosemary powder as an antioxidant.

BACKGROUND TO THE INVENTION

Oxidation is a well-known form of deterioration of chemical compounds. Especially food compositions may suffer from loss of quality due to oxidation, because oxidation can affect the colour, taste, flavour, odour, or nutritional value of many foodstuffs. Such oxidation renders a composition sensorially less attractive and may even make it down-right inedible. A typical example of such oxidation is the development of rancidity. Food stuffs turning rancid will exhibit off-tastes and malodours that are considered very disagreeable by most people. An important class of compounds that are sensitive to oxidation are unsaturated compounds comprising an allylic hydrogen. Such compounds are ubiquitous in foods and include for instance, many lipids, e.g. fatty acids or their derivatives (including fats and oils) and vitamins. The sensitivity to development of rancidity and/or other forms of oxidative deterioration greatly imparts the shelf life of foodstuffs. Therefore, there is a general desire to suppress or inhibit the processes that lead to such product deterioration.

Many different antioxidants have been developed over time to combat oxidation as described above. However, the general appreciation of antioxidants that are perceived by consumers as chemical or artificial products, is declining in favour of more natural antioxidants. Indeed, antioxidant efficacy has been ascribed to plants and plant-derived products. For example, rosemary powder is an effective antioxidant [Redondo-Cuevas, Lucia; Castellano, Gloria; Raikos, Vassilios, International Journal of Food Science & Technology, November 2017, Vol. 52(11), pp. 2422-2428].

M. S. Brewer, Comprehensive reviews in food science and food safety, July 2011, Vol 10(4) pp 221-247 and N. V. Yanishlieva et al, Eur. J. Lipid Sci. Tech., Vol 108(1), January 2006, pp 776-793 provide overviews of herbs and spices with antioxidant properties.

A major drawback of many herbs and spices with pronounced antioxidant activity is that they also have a specific and usually strong sensory profile. That is, their taste, flavour and/or aroma are so strong that they are likely to dominate the overall sensory impression of a food product when they are present at levels that would provide sufficient antioxidant efficacy. Therefore, the use of herbs and spices as antioxidants is generally limited to only such food stuffs in which their sensory contribution is tolerated. Thus, for example, JP09-009921A discloses an anti-oxidative sausage and its production, involving spices with antioxidant activity. RU2464815C1 discloses vegetal seasoning compositions for pork, beef, chicken, fish, potatoes, pasta and rice, providing an extended storage life. JP2015-039311A discloses a spice mix useful for fried food, which provides less deterioration of flavour over time. WO2015/159841A1 discloses a spice mix used in e.g. seasoning for cooking with heat.

WO 2017/220511 A1 discloses the use of micronised antioxidant-containing vegetable material to protect a fat blend from oxidation.

Therefore, it is an object of the present invention to provide compositions with antioxidant efficacy using only plant-based materials. In particular it is an object to provide such efficacy in a manner that allows a reduction of the overall amount of antioxidant materials present. It is a general object of the present invention to overcome or ameliorate problems in the prior art related to oxidation and/or rancidity and/or shelf life, especially in food products. It is another object of the present invention to provide an antioxidant composition which can be applied in other compositions (typically, but not limited to food compositions and/or compositions comprising compounds having an allylic hydrogen) to impart to those compositions improved oxidative stability and/or improved resistance to oxidation and/or rancidity. Similarly, it is also an object of the present invention to provide a composition (such as a food composition) which exhibits such improved oxidative stability. Likewise, it is an object of the present invention to improve the shelf life of compositions that would be sensitive to oxidation. It is yet another object of the present invention to enable the provision of antioxidant efficacy to a composition without negatively impacting its sensory profile. It is a further object of the invention to provide such improvements by the use of an antioxidant system which is natural or perceived as natural. It is therefore also an object of the invention to provide a way to reduce the amount of non-natural antioxidants whilst maintaining the benefits of the presence of such an antioxidant.

Definition of the Invention

We have found that one or more of these objects can be achieved by the present invention. Thus, it was surprisingly found that a combination of ginger powder, sage powder and rosemary powder has stronger antioxidant capability than would be expected on the basis of their individual efficacies, provided that the powders have an appropriate particle size and are combined together in appropriate ratios.

Accordingly, in a first aspect the invention provides a composition, comprising
 a) ginger powder,
 b) sage powder, and
 c) rosemary powder;
wherein the particles of the ginger powder have a size of less than 800 μm, and the sage powder and rosemary powder have a size of less than 500 μm;
and wherein the ginger powder (G), the sage powder (S), and the rosemary powder (R) are present in a weight ratio of G:S:R=1 to 4:1 to 3:1 to 3.

This composition according to the invention may according to one preference take the form of an antioxidant composition, which is typically capable of imparting improved oxidative stability to another composition, upon contacting the latter composition with the former. In another particularly preferred form, the composition according to the invention is a food composition, more preferably a food composition which also comprises compounds sensitive to oxidation, such as for example compounds comprising an allylic hydrogen.

In such compositions, the combination of ginger powder, sage powder and rosemary powder as specified provides particularly advantageous stabilizing properties and oxidation-decelerating, oxidation-inhibiting or anti-autoxidative effects. The combination is particularly well suited to reduce or to avoid altogether undesired flavours and/or tastes that are formed or have formed by oxidative degradation and autoxidation, respectively, or to slow down their formation. Thereby, advantageously a better sensorial durability and stabilization of any preparation containing the specified combination can be achieved. Additionally, combination is widely applicable, particularly as component of specific preparations containing one or more oxidation-sensitive compounds (as described herein). The individual powders of the combination according to the invention are not able to slow down or to avoid altogether the formation of undesired flavours and/or tastes by oxidative degradation and autoxidation, respectively, over a longer period to the same extent as combinations according to the invention are able to.

According to a second aspect of the invention, there is provided a method for improving the oxidative stability of a food composition, wherein the food composition comprises one or more compounds comprising an allylic hydrogen, the method comprising the step of contacting the food composition with a) ginger powder,
b) sage powder, and
c) rosemary powder;

wherein the particles of the ginger powder have a size of less than 800 μm, and the sage powder and rosemary powder have a size of less than 500 μm;
and wherein the ginger powder (G), the sage powder (S), and the rosemary powder (R) are present in a weight ratio of
G:S:R=1 to 4:1 to 3:1 to 3.

A third aspect of the invention pertains to the use of a combination of ginger powder, sage powder, and rosemary powder as an antioxidant, wherein the particles of the ginger powder have a size of less than 800 μm, and the sage powder and rosemary powder have a size of less than 500 μm, and wherein the ginger powder (G), the sage powder (S), and the rosemary powder (R) are present in a weight ratio of
G:S:R=1 to 4:1 to 3:1 to 3.

It is particularly preferred that this use is use in a composition also comprising compounds that are sensitive to oxidation. It is even more preferred that this use is use in a composition also comprising a compound comprising an allylic hydrogen.

DETAILED DESCRIPTION OF THE INVENTION

Any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Moreover, weight percentage (wt. %) is based on the total weight of the product unless otherwise stated. Except in the operating and comparative examples, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient temperature is defined as a temperature of about 20 degrees Celsius.

All ratios by weight as specified herein (in particular with regard to the plant powders of the invention) relate to weight ratios by dry weight of the respective powders.

Composition

In a first aspect the invention provides a composition, comprising ginger powder, sage powder, and rosemary powder; as specified above.

Ginger Powder

Ginger powder is a well-known spice. It is prepared from the rhizome of the ginger plant, also known as Zingiber officinale Roscoe.

Sage Powder

Sage powder is a well-known herb powder, normally prepared from the leaves of plants from the genus *Salvia*. Two species (and their cultivars and hybrids) are commonly used for the preparation of sage powder: *Salvia officinalis* L. and *Salvia fruticosa* (triloba). The latter is also known as *Salvia triloba* L. and as Greek sage. Both *S. officinalis* and *S. fruticosa* are equally suitable for use in the present invention. Sage powder from *Salvia fruticosa* (triloba) is preferred in some applications, whilst sage powder from *Salvia officinalis* L. is preferred in other applications.

Rosemary Powder

Rosemary powder also is a well-known herb powder, which is prepared from the leaves of *Rosmarinus officinalis* L.

The above plant powders (ginger powder, sage powder, rosemary powder) are typically prepared from the fresh leaves (for sage and rosemary) or rhizome (for ginger) by known methods of preparation, as any commonly used ginger, sage or rosemary powder is suitable for use in the present invention. Such methods of preparation normally involve a combination of heat treatment (e.g. pasteurization), drying (e.g. air-drying) and grinding. All three plant powders are generally available as dehydrated powders. Thus the water content of the ginger powder, the sage powder and the rosemary powder used in the present invention is preferably at most 20 wt %, more preferably at most 15 wt % and even more preferably at most 12 wt % by weight of the dry matter of the particular powder. These water contents apply both to the powders of the individual species and to the combined plant powders. The above typical methods of preparation normally lead to enzyme-inactivation. Thus, it is preferred that the ginger, sage and rosemary powders are enzyme-inactivated powders, to provide optimal shelf life and optimal antioxidant properties independent of the formulation in which the combination is applied.

Ratios

The ratios by weight in which the plant powders are present are important for obtaining the surprising effects of the invention. Therefore, the ginger powder (G), the sage powder (S), and the rosemary powder (R) are present in a weight ratio of
G:S:R=1 to 4:1 to 3:1 to 3.

The antioxidant efficacy or any of the related effects may be further enhanced by further adaptation of the ratios.

Therefore, the ginger powder (G), the sage powder (S), and the rosemary powder (R) are preferably present in a weight ratio of
G:S:R=0.7 to 2:0.5 to 1.5:0.5 to 1.5;
more preferably
G:S:R=0.84 to 1.96:0.6 to 1.4:0.6 to 1.4;
even more preferably
G:S:R=0.98 to 1.82:0.7 to 1.3:0.7 to 1.3;
still more preferably
G:S:R=1.12 to 1.68:0.8 to 1.2:0.8 to 1.2.

It is particularly preferred that

G:S:R=1.26 to 1.54:0.9 to 1.1:0.9 to 1.1;

and yet more preferably

G:S:R=1.33 to 1.47:0.95 to 1.05:0.95 to 1.05.

Not only the above G:S:R ratios are preferred, but also the individual pair-wise ratios therein are independently preferred. For example it is preferred that G:S=1.26 to 1.54:0.9 to 1.1 or that G:R=1.26 to 1.54:0.9 to 1.1.

It is also preferred that the ginger powder and the rosemary powder are present in a weight ratio of between 1:1 and 2:1, more preferably between 1.2:1 and 1.8:1, and even more preferably between 1.3:1 and 1.5:1.

Similarly, it is also preferred that the ginger powder and the sage powder are present in a weight ratio of between 1:1 and 2:1, preferably 1.2:1 and 1.8:1, more preferably 1.3:1 and 1.5:1.

Likewise, it is also preferred that the sage powder and the rosemary powder are present in a weight ratio of between 2:1 and 1:2, more preferably 1.5:1 and 1:1.5 and even more preferably between 1.2:1 and 1:1.2.

Other herb or spice powders may be added to the combination of ginger, sage and rosemary powder to further enhance their antioxidant or related properties. Such spice powders include pepper powder and clove powder.

Pepper Powder

Pepper powder surprisingly provided an unexpectedly strong enhancement of the antioxidant efficacy in the composition of the invention. Thus, the composition preferably also comprises pepper powder, wherein the particles of the pepper powder have a size of less than 500 µm. Here, pepper powder means any one of the well-known powdered spices that are prepared from the fruits of *Piper nigrum* L. These fruits (peppercorns) are in common use as a spice in different forms, depending inter alia on the time of harvest (ripe/unripe) and/or their processing. Thus, it is preferred that the pepper powder is peppercorn powder. The spices "black pepper", "white pepper", and "green pepper" all stem from such peppercorns and each of them is highly suitable for use in the present invention. It is particularly preferred that the pepper powder is black pepper powder.

Pepper powder is generally available as a dehydrated powder. Thus the water content of the pepper powder is preferably at most 20 wt %, more preferably at most 15 wt %, even more preferably at most 12 wt % and still more preferably at most 10 wt % by weight of the dry matter of the particular powder. Like for the above powders, the pepper powder preferably is an enzyme-inactivated pepper powder.

The efficacy of the pepper powder in the combination of plant powders used in the present invention is also further enhanced if the pepper powder is used in certain ratios with regard to the other powders.

Therefore, it is preferred that in the composition of the present invention the ginger powder (G), sage powder (S), rosemary powder (R), and pepper powder (P) are present in a weight ratio of G:S:R:P=1 to 4:1 to 3:1 to 3:0.4 to 1.2.

More preferably, these powders are present in a weight ratio of

G:S:R:P=0.7 to 2:0.5 to 1.5:0.5 to 1.5:0.2 to 0.6;

more preferably

G:S:R:P=0.84 to 1.96:0.6 to 1.4:0.6 to 1.4:0.24 to 0.56;

even more preferably

G:S:R:P=0.98 to 1.82:0.7 to 1.3:0.7 to 1.3:0.28 to 0.52;

still more preferably

G:S:R:P=1.12 to 1.68:0.8 to 1.2:0.8 to 1.2:0.32 to 0.48.

It is particularly preferred that

G:S:R:P=1.26 to 1.54:0.9 to 1.1:0.9 to 1.1:0.36 to 0.44;

and yet more preferably

G:S:R:P=1.33 to 1.47:0.95 to 1.05:0.95 to 1.05:0.38 to 0.42;

and still yet more preferably

G:S:R:P=1.36 to 1.44:0.97 to 1.03:0.97 to 1.03:0.39 to 0.41.

Not only the above G:S:R:P weight ratios are preferred, but also all individual pair-wise ratios therein are independently preferred. For example it is preferred that G:P=1.26 to 1.54:0.36 to 0.44 or that S:P=0.9 to 1.1:0.36 to 0.44. Similarly, it is even more preferred that G:P=1.33 to 1.47:0.38 to 0.42 and still more preferred that G:P=1.36 to 1.44:0.39 to 0.41. These G:P pair-wise weight ratios are especially preferred because a synergistic interaction enhancing the antioxidant activity of could be demonstrated for ginger and pepper.

Clove Powder

Clove powder surprisingly provided an unexpectedly strong enhancement of the antioxidant efficacy in the composition of the invention. Thus, the composition of the invention preferably comprises clove powder, wherein the particles of the clove powder have a size of less than 500 µm. Here, clove powder refers to the well-known spice prepared from the unopened buds of *Syzygium aromaticum* (L.) MERR. & Perry, the clove shrub. Any clove powder prepared in a commonly used way is suitable for use in the present invention. Suitable methods of preparation normally involve a combination of heat treatment (e.g. pasteurization or steam treatment), drying (e.g. air-drying) and grinding. Clove powder is generally available as a dehydrated powder. Thus the water content of the clove powder is preferably at most 20 wt %, more preferably at most 15 wt %, even more preferably at most 12 wt % and still more preferably at most 10 wt % by weight of the dry matter of the particular powder. Like for the above powders, the clove powder preferably is an enzyme-inactivated pepper powder.

The efficacy of the clove powder in the combination of plant powders used in the present invention is also further enhanced if it is used in certain ratios with regard to the other powders.

Therefore, it is preferred that in the composition of the present invention the ginger powder (G), sage powder (S), rosemary powder (R), and clove powder (C) are present in a weight ratio of G:S:R:C=1 to 4:1 to 3:1 to 3:0.2 to 0.6.

More preferably, these powders are present in a weight ratio of

G:S:R:C=0.7 to 2:0.5 to 1.5:0.5 to 1.5:0.1 to 0.3;

more preferably

G:S:R:C=0.84 to 1.96:0.6 to 1.4:0.6 to 1.4:0.12 to 0.28;

even more preferably

G:S:R:C=0.98 to 1.82:0.7 to 1.3:0.7 to 1.3:0.14 to 0.26;

still more preferably

G:S:R:C=1.12 to 1.68:0.8 to 1.2:0.8 to 1.2:0.16 to 0.24.

It is particularly preferred that

G:S:R:C=1.26 to 1.54:0.9 to 1.1:0.9 to 1.1:0.18 to 0.22;

and yet more preferably

G:S:R:C=1.33 to 1.47:0.95 to 1.05:0.95 to 1.05:0.19 to 0.21;

and still yet more preferably

G:S:R:C=1.36 to 1.44:0.97 to 1.03:0.97 to 1.03:0.19 to 0.21.

Not only the above G:S:R:C weight ratios are preferred, but also all individual pair-wise ratios therein are independently preferred. For example it is preferred that G:C=1.26 to 1.54:0.18 to 0.22 or that S:C=0.9 to 1.1:0.18 to 0.22. Similarly, it is even more preferred that S:C=0.95 to 1.05: 0.19 to 0.21 and still more preferred that S:C=0.97 to 1.03:0.19 to 0.21.

In view of the above, it is particularly preferred that the composition comprises pepper powder and clove powder, wherein the particles of the pepper powder and the clove powder have a particle size of at most 350 μm. Consequently, it is also preferred that in the composition of the present invention the ginger powder (G), sage powder (S), rosemary powder (R), pepper powder (P), and clove powder (C) are present in a weight ratio of G:S:R:P:C=1 to 4:1 to 3:1 to 3:0.4 to 1.2:0.2 to 0.6.

More preferably, these powders are present in a weight ratio of

G:S:R:P:C=0.7 to 2:0.5 to 1.5:0.5 to 1.5:0.2 to 0.6:0.1 to 0.3;
more preferably
G:S:R:P:C=0.84 to 1.96:0.6 to 1.4:0.6 to 1.4:0.24 to 0.56: 0.12 to 0.28;
even more preferably
G:S:R:P:C=0.98 to 1.82:0.7 to 1.3:0.7 to 1.3:0.28 to 0.52: 0.14 to 0.26;
still more preferably
G:S:R:P:C=1.12 to 1.68:0.8 to 1.2:0.8 to 1.2:0.32 to 0.48: 0.16:0.24.

It is particularly preferred that
G:S:R:P:C=1.26 to 1.54:0.9 to 1.1:0.9 to 1.1:0.36 to 0.44: 0.18:0.22;
and yet more preferably
G:S:R:P:C=1.33 to 1.47:0.95 to 1.05:0.95 to 1.05:0.38 to 0.42:0.19 to 0.21;
and still yet more preferably
G:S:R:P:C=1.36 to 1.44:0.97 to 1.03:0.97 to 1.03:0.39 to 0.41:0.19 to 0.21.

Particle Sizes

The particles of the ginger powder have a size of less than 800 μm. The sage powder, rosemary powder, and—if present—the pepper powder and/or clove powder, have a size of less than 500 μm. The size of the powders is relevant, as it was observed that if too large particles or pieces of these plants were used, their combination did not provide the enhanced antioxidant efficacy of the present invention. Therefore, the particles of the ginger powder preferably have a particle size of less than 500 μm. If the particles are smaller than 500 μm, their efficacy is even further enhanced. Therefore, the particles of the plant powders (i.e. the ginger powder, sage powder, and rosemary powder, and if present the pepper and/or clove powder) preferably have a particle size of less than 350 μm, more preferably less than 315 μm, even more preferably less than 300 μm, and still more preferably less than 275 μm, yet more preferably less than 250 μm and even still more preferably less than 200 μm. These preferences apply both to the separate powders of the individual species and to their combinations.

Such more effective smaller particles may for instance be obtained by finer grinding and/or by sieving out the desired fraction.

Moreover, the efficacy of the plant powders is already improved if a fraction of the material is made smaller, for instance by further grinding without further sieving.

Preferably at least 30 wt %, more preferably at least 50 wt %, even more preferably at least 70 wt %, and still more preferably at least 90 wt % of the particles of the specified ginger powder in the composition is smaller than 500 μm. Likewise, preferably at least 10 wt %, more preferably at least 30 wt %, even more preferably at least 50 wt % of the particles of the specified ginger powder in the composition is smaller than 315 μm.

Preferably at least 50 wt %, more preferably at least 60 wt %, even more preferably at least 70 wt %, and still more preferably at least 80 wt % of the particles of the specified sage powder in the composition is smaller than 315 μm. Likewise, preferably at least 20 wt %, more preferably at least 35 wt %, even more preferably at least 50 wt % of the particles of the specified sage powder in the composition is smaller than 200 μm.

Preferably at least 50 wt %, more preferably at least 75 wt %, even more preferably at least 90 wt % of the particles of the specified rosemary powder in the composition is smaller than 315 μm. Likewise, preferably at least 10 wt %, more preferably at least 25 wt %, even more preferably at least 40 wt %, and still more preferably at least 50 wt % of the particles of the specified rosemary powder in the composition is smaller than 200 μm.

If pepper is present, preferably at least 50 wt %, more preferably at least 60 wt %, even more preferably at least 70 wt %, still more preferably at least 80 wt % and yet more preferably at least 90 wt % of the particles of the specified pepper powder in the composition is smaller than 315 μm. Likewise, preferably at least 20 wt %, more preferably at least 30 wt %, even more preferably at least 40 wt %, still more preferably at least 50 wt % and yet more preferably at least 60 wt % of the particles of the specified pepper powder in the composition is smaller than 200 μm.

If clove is present, preferably at least 10 wt %, more preferably at least 20 wt %, even more preferably at least 30 wt %, and still more preferably at least 40 wt % of the particles of the specified clove powder in the composition is smaller than 315 μm. Likewise, preferably at least 5 wt %, more preferably at least 10 wt % of the particles of the specified clove powder in the composition is smaller than 200 μm.

For the avoidance of doubt: these weight percentages are by dry weight of the plant powders of the invention. For instance, if it is specified that the composition comprises sage powder with a particle size of less than 500 μm and it is preferred that 50 wt % of the sage particles is smaller than 200 μm, this means that 50 wt % of all the sage particles in the composition that are smaller than the "cut-off" size of 500 μm are also smaller than 200 μm.

In certain applications, it may also be preferred if the plant powders have a certain minimum size, for instance to make them easier to handle or easier to dose. Therefore, the particles of the plant powders of the invention preferably have a particle size of at least 0.1 μm, more preferably at least 1 μm, even more preferably at least 10 μm, and still more preferably at least 25 μm.

Plant powders with suitable sizes can be obtained by well-known methods of comminution or grinding and are generally commercially available. If desired, the particle size distribution of a plant powder can be further modified by size selection methods such as sieving or classification (e.g. air classification).

Many of the compositions according to the invention, in particular the food compositions, may also contain particles of plant material of larger sizes, for example for other reasons than their antioxidant properties, e.g. for their sensory properties or visual appearance. Thus, the compositions may also comprise larger particles or pieces of ginger, sage, rosemary, pepper and/or clove. As a consequence, the plant powders of the invention may even be present in the composition as a fraction of a plant material that also includes other particle sizes.

The particle size of the plant powders of the invention is suitably determined by sieving methods.

In general, compositions according to the invention can be prepared by adding or mixing in the ginger, sage, and rosemary powders, and optionally the pepper and/or clove powders, together with some or all of any other ingredients if present. Typical methods of preparation will vary, as the composition of the invention may come in numerous formats. However, general preparatory methods for such formats are known to the skilled person. Therefore, a suitable stage for addition of the combination of plant powders according to the invention can easily be determined for any such format.

Form of the Composition

The composition of the invention can take several forms, depending on its application. In general, two main types of forms can be distinguished, namely compositions intended to impart antioxidant properties to another composition and compositions that have such antioxidant properties themselves. In the latter case, the composition can be any composition in which the antioxidant properties are desired, i.e. typically a composition which also comprises one or more oxidation-sensitive compounds, in particular compounds comprising an allylic hydrogen. The preferred formats and dosing of the inventive plant powders depend on these types of use as explained below.

Antioxidant Composition

The composition of the present invention preferably is an antioxidant composition. In the context of the present invention, an antioxidant composition typically is a composition capable of inhibiting or retarding oxidation of compounds upon application in another composition. The present antioxidant composition preferably is suitable for use in food products. Therefore, the antioxidant composition is preferably suitable for inhibiting or retarding the oxidation of oxidation-sensitive compounds in food compositions, in particular compounds including one or more allylic hydrogens, which are well-known to be sensitive to oxidation, e.g. in the presence of oxygen. It is even more preferred that the antioxidant composition, upon application in a food composition, is capable of retarding or even inhibiting any of the undesired effects of oxidation or auto-oxidation in such foods products, such as the development of rancidity, off-taste, malodour.

In view of this type of use, the antioxidant composition preferably comprises a relatively large amount of the powders that impart antioxidant properties to the composition. Therefore, the antioxidant composition according to the invention preferably comprises the ginger powder, the sage powder, the rosemary powder and, if present, the pepper powder and/or the clove powder in a total amount of at least 50 percent by dry weight of the composition, preferably at least 75 percent, more preferably at least 85 percent, even more preferably at least 95 percent, and still more preferably at least 98 percent by dry weight of the composition. It is most preferred that the antioxidant composition consists essentially of the specified plant powders. In an antioxidant composition that is considered to consist essentially of these powders, further components can be present, namely any not materially affecting the essential characteristics of the antioxidant composition as described herein.

The antioxidant composition preferably comprises from 20 to 50 wt-%, more preferably from 25 to 45 wt-%, even more preferably from 30 to 40 wt-%, and still more preferably 32 to 38 wt-% of the ginger powder. Similarly, the antioxidant composition preferably comprises from 15 to 40 wt-%, more preferably from 20 to 30 wt-%, and even more preferably from 22 to 28 wt % of the sage powder. Likewise, the antioxidant composition preferably comprises from 15 to 40 wt-%, more preferably from 20 to 30 wt-%, and even more preferably from 22 to 28 wt % of the rosemary powder. These preferred amounts are believed to further improve the antioxidant capabilities of the antioxidant composition. The antioxidant composition preferably also comprises pepper powder and/or clove powder as described hereinabove. Thus, the composition preferably comprises at least 1 wt-%, more preferably at least 5 wt-%, and even more preferably at least 7 wt-% of pepper powder. In view of the presence of the other components, the composition preferably comprises from 1 to 20 wt-%, more preferably from 5 to 15 wt-%, even more preferably from 7 to 13 wt-% of pepper powder. Likewise, the antioxidant composition preferably also comprises at least 1 wt-%, more preferably at least 2 wt-%, even more preferably at least 3 wt-% and still more preferably at least 4 wt-% of clove powder. In view of the other components, the antioxidant composition preferably comprises from 1 to 15 wt-%, more preferably from 2 to 12 wt-%, even more preferably from 3 to 10 wt-% and still more preferably from 4 to 8 wt-% of clove powder. All these weight percentages of the plant powders are dry weight percentages, i.e. the wt-% of the dry weight of the respective powders by the dry weight of the composition.

The antioxidant composition can be in any suitable format. For instance the antioxidant composition can be a liquid, a concentrated liquid, a paste, a dry composition (including a dry granulate or a dry powder). Preferably, the antioxidant composition is in dry powder format, even more preferably, it is a free-flowing dry powder. Possible advantages of the latter product format are ease of preparation, good stability and ease upon application in another composition, as a free-flowing powder typically allows for easy dispersal of the antioxidant composition.

In the present context, the antioxidant composition is considered to be dry if it has a dry matter content of at least 80 wt-% by total weight of the composition. It is even more preferred that the antioxidant composition has a dry matter content of at least 85 wt-%, even more preferably at least 90 wt-% by total weight of the composition. Thus, the antioxidant composition preferably has a water activity Aw of at most 0.6, more preferably at most 0.5, even more preferably at most 0.4.

The antioxidant composition may optionally also comprise excipients. Such excipients may be used to improve the usability of the composition. Typical examples include carriers, anti-caking agents, humidity regulating agents, anti-dust agents, or dosing agents (for instance fillers). Suitable excipients are for example crystalline carriers. Thus it is preferred that the antioxidant composition comprises one or more from salt, monosodium glutamate, sugar and/or similar carbohydrates, including for example glucose syrup and/or maltodextrin).

Preferably, the antioxidant composition comprises
a) ginger powder,
b) sage powder sourced from *Salvia fruticosa* or *Salvia officinale*,
c) rosemary powder,
d) pepper powder sourced from *Piper nigrum*, and
e) clove powder;
wherein
the particles of the ginger powder have a size of less than 800 μm, and preferably at least 80 wt-% of the ginger powder has a particle size of less than 0.5 mm;
the particles of the sage powder, rosemary powder and pepper powder have a size of less than 500 μm and preferably at least 80 wt-% of each of the sage, rosemary and pepper powder has a particle size of less than 0.315 mm;

the particles of the clove powder have a particle size of less than 0.5 mm and preferably at least 50 wt-% of the clove powder has a size of less than 0.315 mm;

and wherein the composition has a dry matter content of at least 85 wt-% by total weight of the composition, and the ginger powder, the sage powder, the rosemary powder, the pepper powder, and the clove powder are present in a total amount of at least 75 percent by dry weight of the composition and wherein the ginger powder (G), the sage powder (S), and the rosemary powder (R), pepper powder (P), and clove powder (C) are present in a weight ratio of G:S:R:P:C=1.26 to 1.54:0.9 to 1.1:0.9 to 1.1:0.36 to 0.44:0.18:0.22.

Compositions with Oxidation-Sensitive Compounds

Alternatively, the composition of the invention has a form in which the combination of plant powders is present in order to provide any of its benefits in the composition itself, such as for example food compositions. Food compositions often contain oxidation sensitive compounds, but the benefits of the invention can also be exploited in many non-food compositions. It was surprisingly found that even a very limited amount of the plant powders of the invention (i.e. the ginger, sage, and rosemary powders, and optionally the pepper and/or clove powders) suffices to considerably improve the oxidative stability of products. Therefore, the composition preferably comprises the ginger powder, the sage powder, the rosemary powder and—if present—the pepper powder and/or the clove powder in a total dry amount of from 0.005 to 5 wt-%, more preferably from 0.01 to 2 wt-%, even more preferably from 0.03 to 1 wt-%, and still more preferably from 0.04 to 0.3 wt-% by weight of dry matter of the composition.

Food Composition

It is highly preferred that the composition is a food composition. A food composition in the context of the present invention encompasses, but is not limited to, food products including dry soups, dry sauces, dry savoury concentrates (including those in powder form, granulated form, pressed or extruded form, or in the form of a paste), spreads, salad dressings, dairy products, beverages, dietetic foods, dietary supplements, and others. The composition may contain ingredients common in the art and may be made by methods common in the art.

Oxidation-Sensitive Compounds

The antioxidant effect of the invention is particularly pronounced if the composition comprises compounds that are relatively sensitive to oxidation. An important class of such compounds that is ubiquitous in food compositions are compounds comprising an allylic hydrogen atom.

An allylic hydrogen atom is a hydrogen atom bound to a carbon atom adjacent to a carbon-carbon double bond, as is well-known to the skilled person. The allylic hydrogen can be schematically depicted as:

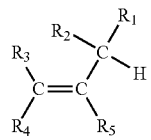

Here, "H" is the allylic hydrogen atom, and $R^1$, $R^2$, $R^3$, $R^4$, and $R^5$, can be any substituent. Compounds comprising an allylic hydrogen atom are often denoted as unsaturated compounds (because of the double bond).

The composition of the present invention preferably comprises one or more compounds comprising an allylic hydrogen atom. Many compounds found in food compositions or food ingredients comprise more than one allylic hydrogen. Moreover, a typical composition is likely to comprise several different compounds comprising at least one allylic hydrogen atom. It is particularly preferred that the composition comprises at least 0.0001 wt-%, more preferably at least 0.001 wt-%, even more preferably at least 0.01 wt-%, still more preferably at least 0.1 wt-%, and yet more preferably at least 0.2 wt-% by weight of dry matter of one or more compounds comprising an allylic hydrogen atom. It is particularly preferred that the composition comprises from 0.0001 to 85 wt-%, more preferably from 0.001 to 75 wt-%, even more preferably from 0.01 to 60 wt-%, still more preferably from 0.1 to 50 wt-%, and yet more preferably from 0.2 to 20 wt-% by weight of dry matter of one or more compounds comprising an allylic hydrogen atom.

Typical examples of compounds comprising an allylic hydrogen atom are unsaturated lipids. In fact, the most important class of oxidation-sensitive compounds, in the context of the present invention, is formed by such unsaturated lipids, in particular those containing unsaturated fatty acids or fatty acid moieties. A lipid is generally understood to refer to a substance of biological origin that is soluble in nonpolar solvents. Other unsaturated compounds comprising allylic hydrogen atoms may include in general any isoprenoic compounds featuring at least one carbon-carbon double bond.

It is preferred that the food composition comprises one or more unsaturated lipids (as the one or more compounds comprising an allylic hydrogen atom). It is especially preferred that the food composition comprises a from 0.01 to 2 wt-% by weight of dry matter of the combination of ginger powder, sage powder, rosemary powder and optionally the pepper powder and/or clove powder, and b at least 0.0001 wt-% by weight of dry matter of one or more unsaturated lipids.

The unsaturated lipids can for example be unsaturated fats, waxes, sterols, fat-soluble vitamines, monoglycerides, diglycerides, triglycerides, or membrane lipids.

Triglycerides, also known as triacylglycerols (TAGs), are the major constituents of natural fats and oils and are esters of glycerol and fatty acids.

The fat-soluble vitamins notably include the vitamins classified as vitamin A, D, E, and K. All these well-known classes themselves include several distinguished compounds, generally known as vitamers. For example, the A-vitamins include at least vitamins A1, A2, and A3 and the D-vitamins include at least vitamins D1, D2, D3, D4, and D5. The E-vitamins include tocopherols and tocotrienols. The K-vitamins include at least vitamins K1, K2, and K3. Oxidation of such vitamins is likely to change their nutritional properties and therefore also the nutritional value of the food composition comprising them.

Membrane lipids are the lipids which form the double-layered membrane of living cells. Therefore, they are also found back in many food products. The main classes of membrane lipids are phospholipids, glycolipids and cholesterol (which is a sterol). The phospholipids encompass phosphoglycerides and sphingomyelines. Phospholipid and glycolipid molecules typically include a fatty acid moiety.

Therefore, unsaturated membrane lipids are sensitive to oxidation in much the same way as other fatty acid derivatives.

In view of the above, the composition of the invention (in particular if it is a food composition) preferably comprises one or more unsaturated lipids selected from triglycerides, diglycerides, monoglycerides, membrane lipids, and vitamins, more preferably selected from triglycerides, diglycerides, monoglycerides, phospholipids, and vitamins, and even more preferably selected from triglycerides, diglycerides, monoglycerides, and phospholipids.

The preferred amounts provided above for the one or more compounds comprising an allylic hydrogen atom also apply to these preferred unsaturated lipids.

Edible oils are a common source of unsaturated lipids, in particular unsaturated triglycerides, but also diglycerides, monoglycerides and free fatty acids. Moreover, edible oils are important food ingredients. Consequently, the composition of the invention preferably comprises an edible oil.

Edible oils contain a large number of different triacylglycerols (TAGs) with varying physical properties. The TAGs in edible fats are composed of fatty acids with an even number of carbon atoms in the chains, generally varying between 4 and 24 in number. Common fatty acids from vegetable origin are C10, C12, C14, C16, C18, C20 and C22, and most common TAGs are composed of these fatty acids. Moreover, each fatty acid can contain up to three double bonds at certain positions in the chain. The terms "triacylglycerols", 'TAGs', and 'triglycerides' may be used interchangeably in here. The term 'oil' as used herein refers to lipids selected from triglycerides, diglycerides, monoglycerides and combinations thereof.

The terms "oil" and "fat" encompass fats that are liquid at ambient temperature as well as fats that are solid or semi-solid at ambient temperature. Thus, 'fat' and 'oil' are used interchangeably unless specified otherwise. Where applicable the prefix 'liquid' or 'solid' is added to indicate if the fat or oil is liquid or solid at ambient temperature as understood by the person skilled in the art. The solid fat content at a given temperature (for example the N20 at 20° C.) can suitably be determined using ISO 8292-1 (2012)—Determination of solid fat content by pulsed NMR.

Examples of sources of conventional edible oils and fats include coconut oil, palm kernel oil, palm oil (and fractions thereof including palm olein and palm stearin), marine oils (including fish oil), lard, tallow fat, butter fat, chicken oil, soybean oil, safflower oil, cotton seed oil, rapeseed oil, linseed oil, sesame oil, poppy seed oil, corn oil (maize oil), sunflower oil, peanut oil, rice bran oil, olive oil, algae oil, shea fat, and alanblackia and blends thereof. For the purpose of this invention, algae oils are considered vegetable oils.

The amount and type of edible oil present in the composition depends largely on the requirements for the particular product format of the composition, as detailed below.

In general, it is strongly preferred that the edible oil is edible vegetable oil, as these typically comprise a relatively large amount of unsaturated glycerides. More preferably, the edible oil is selected from soybean oil, sunflower oil, rapeseed oil, corn oil (maize oil), olive oil, linseed oil, palm olein and fractions and combinations thereof, and even more preferably from sunflower oil, rapeseed oil, olive oil and linseed oil. The combination of plant powders according to the invention is particularly suitable to decelerate, suppress or inhibit the oxidation of these oils.

Animal oils may also be sensitive to oxidation. Thus, in some compositions, the edible oil is preferably chicken oil.

It is generally preferred that the composition comprises from 0.5 to 85 wt-% of oil, by weight of the composition.

Thus, the composition of the invention preferably is a food composition comprising
 a) ginger powder,
 b) sage powder sourced from *Salvia fruticosa* or *Salvia officinale*,
 c) rosemary powder,
 d) optionally pepper powder sourced from *Piper nigrum*, and
 e) optionally clove powder;
 f) 0.5 to 60 wt-% of edible oil by dry weight of the composition;
wherein
 the particles of the ginger powder have a size of less than 800 µm, and preferably at least 80 wt-% of the ginger powder has a particle size of less than 500 µm;
 the particles of the sage powder, rosemary powder and pepper powder have a size of less than 500 µm and preferably at least 80 wt-% of each of the sage, rosemary and pepper powder has a particle size of less than 315 µm;
 the particles of the clove powder have a particle size of less than 500 µm and preferably at least 50 wt-% of the clove powder has a size of less than 315 µm;
and wherein the combination of ginger powder, sage powder, rosemary powder and optionally the pepper powder and/or clove powder constitutes from 0.01 to 2 wt-% by weight of dry matter of the composition,
and wherein the ginger powder (G), the sage powder (S), and the rosemary powder (R), pepper powder (P), and clove powder (C) are present in a weight ratio of G:S:R:P:C=1.26 to 1.54:0.9 to 1.1:0.9 to 1.1:0.36 to 0.44:0.18:0.22.

Dry Concentrate

Dry concentrates, in particular savoury concentrates are product formats in which the present invention can suitably be applied. Therefore, the composition of the invention preferably is a savoury concentrate. Such concentrates typically serve to prepare ready-to-eat compositions. Thus, savoury concentrates include for instance dry soups, dry sauces, seasonings, bouillon powders, and meal-makers.

The savoury concentrate preferably comprises
 a) 3 to 85 wt-% of inorganic salt;
 b) 0.5 to 60 wt-% of fat;
 c) the combination of ginger powder, sage powder, rosemary powder and optionally pepper powder and/or clove powder; and
 d) optional further components;
wherein the wt-% is by weight of dry matter of the total composition.

More preferably, the savoury concentrate comprises
 a) 3 to 85 wt-% of inorganic salt;
 b) 0.5 to 60 wt-% of fat;
 c) the combination of ginger powder, sage powder, rosemary powder and optionally pepper powder and/or clove powder;
 d) 0 to 50 wt-% of savoury taste-giving ingredients selected from glutamate, 5'-ribonucleotides, sucrose, glucose, fructose, lactic acid, citric acid and combinations thereof;
 e) 0 to 25 wt-% of starch component selected from native starch, pregelatinised starch, maltodextrin, modified starch and combinations thereof;
 f) 0 to 45 wt-% of vegetable matter other than (c), selected from vegetables, herbs, spices and combinations thereof;
 g) 0 to 10 wt-% of water;
wherein the wt-% is by weight of dry matter of the total composition.

Here, the components a) to e) together preferably constitute at least 55 wt. % of the savoury concentrate and the components a) to g) together preferably constitute at least 75 wt. % of the savoury concentrate.

The dry concentrate, in particular the savoury concentrate, can come in several forms or shapes: typical forms are free-flowing powders, granulates, shaped concentrates and pastes.

Savoury Concentrate in Powder Form

Food compositions (especially savoury concentrates and intermediate products for the preparation of such concentrates) comprising a substantial amount of ingredients in the form of powder may be sensible to dusting, in particular if the powder contains very fine particles. In order to reduce or completely suppress such undesired dusting, a relatively small amount of edible oil is usually added as an anti-dust agent. In typical situations, such a composition comprises 0.5 to 2.0 wt-%, more preferably 1 to 1.5 wt-% by weight of dry matter of edible oil. Vegetable oil is particularly preferred in such applications, and so is chicken fat. The oil that is used as an anti-dust agent is notoriously sensitive to the development of rancidity and other oxidation-related defects. Therefore, fully saturated (and typically hardened) fats that are solid at room temperature are often used, or a non-natural antioxidant would be required. It was found that the combination of plant powders of the invention is particularly effective in reducing the rate of such oxidation in compositions comprising oil as an anti-dust agent. Therefore, the present invention allows the use of edible oils with a substantial amount unsaturated compounds. Therefore, the composition of the invention preferably is a dry concentrate in powder form, comprising a) 3 to 85 wt-% of inorganic salt;
b) 0.5 to 2 wt-%, more preferably 1 to 1.5 wt-% of of edible oil selected from vegetable oils that are liquid at room temperature, chicken fat or combinations thereof;
c) the combination of ginger powder, sage powder, rosemary powder and optionally pepper powder and/or clove powder; and
d) optional further components;

wherein the wt-% is by weight of dry matter of the total composition.

More preferred oils in this product format are soybean oil, sunflower oil, rapeseed oil, corn oil (maize oil), olive oil, linseed oil, palm olein and fractions and combinations thereof, and even more preferably oils are sunflower oil, rapeseed oil, olive oil and linseed oil.

Granulated Savoury Concentrate

In one preferred embodiment, the savoury concentrate is a granulate having a mass weighted average diameter in the range of 0.1-5 mm, said granulate comprising the following components:

a) 35-85 wt. %, preferably 40-75 wt. % of inorganic salt;
b) 3-20 wt. %, preferably 4-15 wt. % fat;
c) the combination of ginger powder, sage powder, rosemary powder and optionally pepper powder and/or clove powder;
d) 2-20 wt. %, preferably 5-15 wt. % of the savoury taste-giving ingredients; wherein the wt-% is by weight of dry matter of the total composition.

The granulate preferably has a mass weighted average diameter in the range of 0.2-2 mm, most preferably in the range of 0.25-1.5 mm.

Shaped Savoury Concentrate

In accordance with another preferred embodiment of the invention, the savoury concentrate is a shaped article having a weight of 2-50 g, said shaped article comprising the following components:

a) 35-70 wt. %, preferably 40-60 wt. % of the inorganic salt;
b) 5-30 wt. %, preferably 15-25 wt. % of the fat, said fat having a solid fat content at 20° C. ($N_{20}$) of at least 5%;
c) the combination of ginger powder, sage powder, rosemary powder and optionally pepper powder and/or clove powder;
d) 0-20 wt. %, preferably 2-18 wt. % of the savoury taste-giving ingredients; wherein the wt-% is by weight of dry matter of the total composition.

The shaped article preferably has a weight in the range of 2.5-30 g, more preferably in the range of 3.0-28 g and most preferably of 3.2-24 g. The shaped concentrate article can suitably be provided in different forms. Preferably, the article is provided in the form of a cuboid, more preferably in the form of a rectangular cuboid and most preferably in the form of a cube. The fat contained in the shaped article preferably has a $N_{20}$ of at least 10%, more preferably of 25-95% and most preferably of 50-90%.

Savoury Concentrate in Paste Form

In yet another embodiment the savoury concentrate is in the form of a paste. Such a past preferably comprises a) 3 to 30 wt-% by dry weight of the total composition of the inorganic salt;
b) at least 30 wt-% by dry weight of the total composition of an oil phase comprising liquid oil in an amount of at least 30 wt-% by weight of the oil phase;
c) the combination of ginger powder, sage powder, rosemary powder and optionally pepper powder and/or clove powder;
d) 1 to 50 wt-% by dry weight of the total composition of the savoury taste giving ingredients.

The term 'oil phase' as used herein refers to a distinct lipid phase within the savoury concentrate that contains oil and optionally other lipids. Non-lipid components that are dispersed in the oil phase are not part of the oil phase. The concentration of liquid oil in the oil phase of a savoury concentrate equals 100%-$N_{20}$. Thus, a savoury concentrate containing 48 wt. % oil phase having a $N_{20}$ of 5 wt. %, has a liquid oil content of 0.48×95=45.6 wt. %. Preferably, the oil phase contains at least 50 wt. % of vegetable oil, more preferably at least 70 wt. % and even more preferably the oil phase contains at least 90 wt. % of vegetable oil.

Preferred Components of the Savoury Concentrate

The savoury concentrate preferably comprises inorganic salt. The inorganic salt is added to provide a salty taste. The salt preferably comprises NaCl, KCl and mixtures thereof. The high level of inorganic salt is predominantly present to provide the desired salty taste impact after dissolution in a relatively high volume. Preferably, the amount of inorganic salt in the food concentrate is at least 3 wt %, more preferably at least 5 wt %, even more preferably at least 8 wt %, still more preferably at least 10 wt %, yet more preferably at least 15 wt %, and even still more preferably at least 20 wt % by dry weight of the composition. Preferably, the amount of inorganic salt is at most 70 wt %, more preferably at most 60 wt %, even more preferably at most 50 wt %, and still more preferably at most 40 wt %, by dry weight of the composition. Preferably, the amount of NaCl in the savoury concentrate is at least 3 wt %, more preferably at least 5 wt %, even more preferably at least 10 wt %, still more preferably at least 15 wt % and preferably at most 60 wt %, more preferably at most 55 wt %, and still more preferably at most 50 wt %, by dry weight of the total composition.

In addition to the preferences expressed above, for the fat contained in the food composition, the fat contained in the savoury concentrate preferably has a $N_{20}$ of 0-60%, more preferably of 5-40% and most preferably of 10-30%.

The savoury concentrate is for example for preparing a bouillon, a soup, a sauce, a gravy or a seasoned dish. To contribute to the savoury taste, the savoury concentrate may further comprise savoury taste-giving ingredients selected from the group consisting of glutamate, 5'-ribonucleotides, sucrose, glucose, fructose, lactic acid, citric acid and mixtures thereof. The term savoury taste-giving ingredients used in the plural may refer to a single compound or a mixture of more than one taste-giving compounds. The amount of savoury taste-giving ingredients present in the savoury concentrate is preferably an effective amount to obtain the desired level in the ready-to-eat product that is prepared from the concentrate. The effective amount depends on the desired dilution rate and amount in the ready-to-eat product. The savoury taste-giving ingredient in the concentrate is preferably present in an amount of at most 40 wt %, more preferably of at most 30 wt %, more preferably in an amount of at most 25 wt %, most preferably in an amount of at most 15 wt %, and preferably at least 0.1 wt %, more preferably at least 0.5 wt %, more preferably at least 1 wt %, more preferably at least 5 wt %, based on the dry weight of the total savoury concentrate. It is understood that any savoury taste-giving compound can be added as such or as part of more complex food ingredients like yeast extract; hydrolyzed proteins of vegetables-, soy-, fish-, or meat-origin, malt extract, beef flavourings, onion flavouring, liquid or dissolvable extracts or concentrates selected from the group consisting of meat, fish, crustaceans, herbs, fruit, vegetable and mixtures thereof.

The savoury concentrate preferably contains a starch component selected from native starch, pregelatinised starch, maltodextrin, modified starch and combinations thereof. The starch component is preferably present in the savoury concentrate in a concentration of 3-20 wt. %, more preferably of 4-18 wt. % and most preferably of 5-15 wt. %. The starch component is preferably selected from native starch, maltodextrin, pregelatinised starch and combinations thereof. Even more preferably, the starch is selected from native starch, pregelatinised starch and combinations thereof. Most preferably, the starch component is native starch. The starch component typically has a mass weighted mean diameter in the range of 5-200 μm, more preferably of 10-100 μm, most preferably of 12-60 μm.

The savoury concentrate preferably comprises vegetable matter other than the combination of ginger powder, sage powder, rosemary powder and, optionally, pepper powder and/or clove powder according to the invention. This vegetable matter is preferably applied in the form of leafs, slices, florets, dices or other pieces. Thus, the savoury concentrate preferably comprises 0 to 30 wt. %, more preferably 0 to 20 wt-% and even more preferably 1 to 10 wt % by dry weight of the total composition of such vegetable matter (other than the specified plant powders) selected from vegetables, herbs, spices and combinations thereof. Examples of sources of vegetable matter include parsley, dill, basil, chives, sage, rosemary, thyme, oregano, leek, onion, mushrooms, broccoli, cauliflower, tomato, courgette, asparagus, bell pepper, egg plant, cucumber, carrot and coconut flesh.

According to another preferred embodiment, the savoury concentrate contains 0-10 wt. %, more preferably 0.5-8 wt. % and most preferably 1-5 wt. % of gelatine component, said gelatine component being selected from gelatine, hydrolysed gelatine and combinations thereof.

The savoury concentrate typically contains less than 9 wt. % water. More preferably, the concentrate contains 1-8 wt. % water. Most preferably, the concentrate contains 2-7 wt. % water. The water content in the food concentrate can be measured by any standard method including drying the food concentrate and comparing the weight before and after drying.

The food concentrate according to the invention preferably has a water activity of less than 0.65, more preferably less than 0.5, even more preferably less than 0.4, more preferably less than 0.3 and preferably more than 0.15.

The savoury concentrate of the present invention preferably is a packaged savoury concentrate. The portion of the concentrate as packaged preferably has a weight (excluding packaging) of 1 g to 1 kg, preferably 2-250 g, more preferably 5-50 g. The packaging can be e.g. a container, a pouch or a wrapper.

Wet Food Compositions

The combination of plant particles of the present invention also performs very well in wet compositions comprising vegetable oils, such as sauces like mayonnaise. Such compositions often rely on antioxidants like EDTA to obtain an acceptable shelf life. Therefore, the invention provides the use of combination of plant particles of the invention in a composition comprising vegetable oil comprising mono-unsaturated or poly-unsaturated fatty acids, to reduce the oxidation rate of the vegetable oil.

The combination of plant particles used in the composition of the invention, leads to reduced oxidation of the vegetable oil, and therefore the amount of EDTA that is added to such composition can be reduced. Therefore, preferably the concentration of EDTA is lower than 0.005% by weight, preferably lower than 0.002% by weight of the composition. More preferred the concentration of EDTA is lower than 0.001% by weight, more preferred the concentration of EDTA is lower than 0.0005% by weight, and most preferred EDTA is absent from the composition of the invention.

Oil-in-Water Emulsion

Preferably the composition of the invention is in the form of an oil-in-water emulsion. Examples of oil-in-water emulsions encompassed by the preferred invention include mayonnaise, dressings, salad dressings, and sauces. Preferably, the oil-in-water emulsion is a mayonnaise or a sauce, most preferably a mayonnaise. Preferably the composition of the invention is a low-fat mayonnaise.

Preferably the oil in the context of this oil-in-water emulsion comprises at least 90 wt % of triglycerides, more preferably at least 95 wt %. Preferably the oil contains less than 20 wt % of solid oil at 5° C., preferably less than 10 wt % solid oil. More preferred the oil is free from solid oil at 5° C. Most preferred the oil is liquid at 5° C. Preferred oils for use in the context of this invention are vegetable oils which are liquid at 5° C. Preferably the oil comprises sunflower oil, rapeseed oil, olive oil, soybean oil, and combinations of these oils. The mono-unsaturated fatty acids as comprised in the oil preferably comprise oleic acid. The poly-unsaturated fatty acids as comprised in the oil preferably comprise linoleic acid and linolenic acid.

In the oil-in-water emulsion, the concentration of the vegetable oil ranges from 5% to 85% by total weight of the composition. Preferably the emulsion comprises from 10% to 80%, more preferably from 15% to 75% by total weight of the emulsion of vegetable oil. Preferably, the amount of oil is at least 20% by weight, more preferably at least 30% by weight, and even more preferably at least 35% by weight. Preferably, the concentration of vegetable oil is maximally 70% by weight, preferably maximally 65%, preferably maximally 60%. Any combination of ranges using these mentioned end points are considered to be part of the invention as well.

In case the preferred oil-in-water emulsion is a low-fat mayonnaise, the amount of oil preferably ranges from 20% to 60% by weight, preferably from 30% to 55% by weight preferably from 35 to 50% by weight of the composition. Generally, such a mayonnaise or low-fat mayonnaise is spoonable. "Spoonable" means that a composition is semi-solid but not free-flowing on a time scale typical for eating a meal, meaning not free-flowing within a time period of an hour. A sample of such substance is able to be dipped with a spoon from a container containing the composition.

In another preferred embodiment, the oil-in-water emulsion is a salad dressing. Generally, such salad dressing is a pourable liquid. In such case the amount of oil preferably ranges from 5% to 60% by weight, preferably from 10% to 55% by weight preferably from 15 to 50% by weight of the composition. The preferred emulsions typically are pourable or spoonable as opposed to solid. In case the preferred emulsion is non-pourable, it is preferred that the consistency of the emulsion is such that it cannot be cut in two as the parts of the emulsion that have been divided by the cutting will confluence after the cutting.

Mayonnaise is generally known as a thick, creamy sauce that can be used as a condiment with other foods. Mayonnaise is a stable water-continuous emulsion of vegetable oil, egg yolk and either vinegar or lemon juice. In many countries, the term mayonnaise may only be used in case the emulsion conforms to the 'standard of identity', which defines the composition of a mayonnaise. For example, the standard of identity may define a minimum oil level, and a minimum egg yolk amount. Also, mayonnaise-like products having oil levels lower than defined in a standard of identity can be considered to be mayonnaises. These kinds of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with vegetable oil levels ranging from 5% to 85% by weight of the product. Mayonnaises in the context of the present invention do not necessarily need to conform to a standard of identity in any country.

In case the food composition of the invention is an oil-in-water emulsion, then preferably the composition comprises an oil-in-water emulsifier. The emulsifier serves to disperse oil droplets in the continuous aqueous phase. The preferred oil-in-water emulsion of the invention comprises egg yolk. The presence of egg yolk may be beneficial for taste, emulsification and/or stability of the oil droplets in the composition of the invention. Egg yolk contains phospholipids, which act as emulsifier for the oil droplets. Preferably the concentration of egg yolk in the composition of the invention ranges from 1% to 8% by weight of the emulsion, more preferred from 2% to 6% by weight of the emulsion. The egg yolk may be added as egg yolk component, meaning largely without egg white. Alternatively, the composition may also contain whole egg, containing both egg white and egg yolk. The total amount of egg yolk in the composition of the invention includes egg yolk that may be present as part of whole egg. Preferably the concentration of phospholipids originating from egg yolk ranges from 0.05% to 1% by weight, preferably from 0.1% to 0.8% by weight of the emulsion.

Part or all of the egg yolk may have been subjected to an enzymatic conversion process using phospholipase. Preferably the phospholipase that is used to treat egg yolk is phospholipase A2. This process leads to split off of fatty acid chains from the phospholipid molecules, and yields enzyme-modified egg yolk. The reaction products of this enzymatic process are retained in the enzyme-modified egg yolk, meaning that the enzyme-modified egg yolk contains fatty acids split off from the phospholipids. A suitable source of enzyme modified egg yolk is 'Heat stabilised egg yolk (92-8)', supplied by Bouwhuis Enthoven (Raalte, the Netherlands). Preferably, the concentration of egg yolk which has been modified by treatment with phospholipase ranges from 0.5% to 4% by weight of the composition, preferably from 1% to 4% by weight of the composition.

Preferably the preferred oil-in-water emulsion has a pH ranging from 3 to 5, more preferably ranging from 3 to 4.6, and even more preferably from 3 to 4. This pH is suitably measured at 20° C. Suitable acids to obtain that pH are selected from acetic acid, citric acid, lactic acid, malic acid, phosphoric acid, hydrochloric acid, glucono-delta-lactone and combinations thereof. Preferably, the emulsions comprise acetic acid, citric acid or combinations thereof.

Preferably oil droplets dispersed in the preferred oil-in-water emulsion have a surface weighted mean diameter D3,2 of less than 10 micrometer, preferably from 0.3 to less than 10 micrometer, preferably from 0.5 to 8 micrometer, preferably less than 6 micrometer. This mean diameter may suitably be determined using the method described by Goudappel et al. (Journal of Colloid and Interface Science 239, p. 535-542, 2001). Typically, 80 to 100% of the total volume of the oil droplets contained in the composition of the invention have a diameter of less than 15 micrometer, more preferably a diameter ranging from 0.5 to 10 micrometer.

The combination of ingredients in the preferred oil-in-water emulsion has a very significant effect on the rheological properties of the emulsion, e.g. in that it provides an elastic modulus G', measured at 20° C., within the range of 100 to 1,000 Pa, most preferably in the range of 300 to 700 Pa at a strain (deformation) of 1%.

The dynamic viscosity of the preferred oil-in-water emulsion preferably ranges from 0.5 to 30 Pa·s, more preferably from 1 to 10 Pa·s at a shear rate of 50 s$^{-1}$ and 20° C. The viscosity can be determined using an AR1000 controlled stress rheometer ex TA Instruments (New Castle, Del., USA).

The preferred oil-in-water edible emulsion may suitably contain one or more additional ingredients. Examples of such optional ingredients include thickeners like starches or gums, salt, sugar, spices, vitamins, flavouring, colouring, mustard, herbs and pieces of meat, vegetable or cheese. Such optional additives, when used, collectively, do not make up more than 40%, more preferably not more than 20%, preferably not more than 10% by weight of the composition.

The preferred oil-in-water emulsion may be prepared by any common method in the art.

Water-in-Oil Emulsion

In yet another form, the food composition of the invention is preferably in the form of a water-in-oil emulsion. Such fat continuous food products are well known in the art and include preferably shortenings comprising a fat phase and margarine comprising a fat phase and an aqueous phase. Margarine traditionally contains about 80% of an edible fat phase, and 20% of an aqueous phase, that is dispersed as small droplets in the continuous edible fat phase. Other examples of water-in-oil emulsions are low-fat spreads, in which the proportion of edible fat phase is lower and aqueous phase is higher than margarine, for example about 10 to 40% edible fat phase and about 60 to 90% aqueous phase. For the purpose of the present invention, margarine includes water-in-emulsions containing from 10 to 80% by weight of fat.

The fat phase of margarine and similar edible fat continuous spreads is often a mixture of liquid oil and structuring fat. The structuring fat serves to structure the fat phase (for example in a shortening as well as in a water-in-oil emulsion) and helps to stabilize the aqueous phase, if present, by forming a fat crystal network. For a margarine or spread, ideally the structuring fat has such properties that it melts or dissolves at mouth temperature upon consumption.

The liquid oil preferably has the same preferred features and preferred origin as disclosed in the context of the preferred oil-in-water emulsion.

The structuring fat may be a single fat or a mixture of different fats. The structuring fat may be of vegetable, animal (e.g. dairy fat) or marine origin. Preferably at least 50 wt % of the structuring fat (based on total amount of structuring fat) is of vegetable origin, more preferably at least 60 wt %, even more preferably at least 70 wt %, still more preferably at least 80 wt %, even still more preferably at least 90 wt % and even still more further preferably at least 95 wt %. Most preferably the structuring fat essentially consists of structuring fat of vegetable origin.

Preferably the natural fat is selected from the group consisting of palm fat, allan blackia, pentadesma, shea butter, coconut oil, soybean oil, rapeseed oil and dairy fat. More preferably the natural fat is selected from the group consisting of palm oil, palm kernel oil, palm oil fraction, palm kernel fraction, coconut oil and dairy fat fraction. Even more preferably the natural fat is selected from the group consisting of palm oil, palm kernel oil, palm oil fraction, palm kernel fraction and coconut oil.

The various fat sources may be fully hardened by full hydrogenation, they may be fractionated, intra-esterified, and/or inter-esterified.

The structuring fat may comprise minor amounts of other components like for example monoglycerides that are naturally present in the fat.

To optimize the structuring capacity and/or impression of the emulsion in the mouth upon consumption, structuring fats having a certain solid fat content are preferred. Therefore, the structuring fat as present in the solid particles preferably has a solid fat content N10 from 50 to 100%, N20 from 26 to 95% and N35 from 5 to 60%. The N-value expresses the solid fat content (SFC) at a certain temperature (in ° C.).

The structuring fat preferably has a solid fat content N10 selected from the list consisting of 45 to 100%, 55 to 90% and 65 to 85%; N20 selected from the list consisting of 25 to 80%, 40 to 70% and 45 to 65%; N35 selected from the list consisting of 0.5 to 60%, 0.5 to 20%, 0.5 to 14%, 15 to 50% and 30 to 45%.

Preferred solid fat content profiles of the structuring fat are: N10 from 45 to 100%, N20 from 25 to 80% and N35 from 0.5 to 60%; N10 from 55 to 90%, N20 from 40 to 70% and N35 from 0.5 to 20%; N10 from 55 to 90%, N20 from 40 to 70% and N35 from 15 to 50%; N10 from 65 to 85%, N20 from 45 to 65% and N35 from 0.5 to 14%; and N10 from 65 to 85%, N20 from 45 to 65% and N35 from 30 to 45%.

Generally edible fat continuous food products like for example margarines and similar edible fat continuous spreads are prepared according to known processes.

Preferably the weight ratio between structuring fat and liquid oil ranges from 1:100 to 50:100, preferably from 5:100 to 25:100. This means that the total fat phase of the emulsion preferably comprises from 1% by weight to 50% by weight of structuring fat, and from 50% by weight to 99% by weight of liquid oil. More preferably the total fat phase of the emulsion preferably comprises from 5% by weight to 25% by weight of structuring fat, and consequently from 75% by weight to 95% by weight of liquid oil. With these ratios a fat-continuous emulsion can be produced which has the correct hardness and consistency.

An emulsifier may be comprised in the composition to create a good dispersion of aqueous phase in the fat phase. Preferably the composition of the invention comprises a water-in-oil emulsifier. The emulsifier preferably has a HLB value of lower than 7. The HLB value is the hydrophilic-lipophilic balance, and is a measure for the degree of hydrophilicity or lipophilicity. An emulsifier with a HLB value lower than 10 generally is oil soluble, while an emulsifier with a HLB value higher than 10 generally is water-soluble. Hence preferably an emulsifier having a HLB value of 7 or lower, is mixed with the liquid oil prior to mixing with the other ingredients of the composition of the invention. Preferably, the concentration of the emulsifier is maximally 5% based on the weight of the mixture of liquid oil and emulsifier, preferably maximally 1%, preferably maximally 0.1%, preferably maximally 0.01%. A relatively high emulsifier content may lead to the ability to produce low fat or very low fat water-in-oil emulsions, although a relatively high emulsifier content is not necessary to produce low-fat water-in-oil emulsions.

Preferably the emulsifier comprises a monoglyceride of fatty acid, or a diglyceride of fatty acids. Preferably the emulsifier comprises one or more emulsifiers chosen from the group consisting of saturated monoglycerides, unsaturated monoglycerides, and sugar-fatty acid esters (also known as the 'Spans', e.g. sorbitan monostearate). Preferably the HLB value of the emulsifier is lower than 5, preferably lower than 3, preferably 1. Another preferred emulsifier is lecithin from soyabean, or egg.

The amount of aqueous phase and fat phase in the preferred water-in-oil emulsion may range widely. The fat phase includes the structuring fat and the liquid oil, and preferably an emulsifier as defined before. Preferably the concentration of the fat phase ranges from 5% to 95% based on the weight of the emulsion, preferably from 15% to 50%. The emulsion may comprise a fat phase as a majority phase (for example, a margarine containing about 70 to 80% by weight of fat phase), preferably the emulsion comprises from 10% to 80%, preferably from 15% to 60% fat phase based on the weight of the emulsion. Most preferably though the produced emulsion is a low fat emulsion with a fat content ranging from 15% to 50% by weight, preferably ranging from 18% to 45% by weight of fat phase, preferably ranging from 25% to 45% by weight of fat phase, preferably ranging from 30% to 45% by weight of fat phase. An advantage of the method of the present invention is that low fat spreads (maximally 50% by weight of fat phase) can be produced in a single step.

The aqueous phase is dispersed in small droplets in the continuous fat phase during the mixing in the mixing apparatus. Preferably the D3,3 value of the dispersed aqueous phase droplets is less than 10 micrometer, preferably less than 8 micrometer, preferably less than 6 micrometer. Preferably the D3,3 value of the dispersed aqueous phase droplets is less than 3 micrometer, or even less than 2 micrometer. D3,3 is the volume weighted geometric mean particle or droplet diameter (M. Alderliesten, Particle & Particle Systems Characterization 8 (1991) 237-241).

Preferably the preferred water-in-oil emulsion has a pH ranging from 4 to 6, preferably ranging from 4 to 5.5, preferably from 4.5 to 5.5. This pH preferably is measured at 20° C. Suitable acids to obtain that pH are selected from acetic acid, citric acid, lactic acid, malic acid, phosphoric acid, hydrochloric acid, glucono-delta-lactone and combinations thereof.

The preferred water-in-oil emulsion may suitably contain one or more additional ingredients. Examples of such optional ingredients include thickeners like starches or gums, salt, sugar, spices, vitamins, flavouring, colouring, herbs, spices. Such optional additives, when used, collectively, do not make up more than 40%, more preferably not more than 20%, preferably not more than 10% by weight of the composition.

Antioxidant Benefits

In view of the above-described benefits of the combination of plant powders according to the invention, the composition (in particular if it is a food composition) preferably has a shelf life which is longer than that of the same product without the presence of the combination of plant powders (the ginger powder, sage powder, and rosemary powder and optionally the pepper and/or clove powder), more preferably, it has a shelf life which is at least twice as long, even more preferably at least three times as long, in particular in as far as oxidation-induced defects limit the shelf life. The same preferences also apply to the open shelf life of the composition. Therefore, the composition preferably has a deceleration factor (DF) of at least 2, more preferably at least 2.5, still more preferably at least 3, still more preferably at least 3.5. Here, the deceleration factor (DF) is a measure for the deceleration of the occurrence of defects, in particular of rancidity in a product, in comparison to the same product without the combination of plant powders of the invention, as described in the Examples section. Hence, the product preferably has a shelf life of at least 3 months, more preferably at least 6 months, even more preferably at least 9 months, still more preferably at least 12 months, yet more preferably at least 18 months and still yet more preferably at least 24 months. The product preferably has such a shelf life without relying on other antioxidants. That is, the product preferably comprises not more than 200 ppm, more preferably not more than 100 ppm, even more preferably not more than 50 ppm by weight of dry matter of non-natural antioxidants. Still more preferably, the composition is substantially free from non-natural antioxidants, such as for example BHT (butylhydroxytoluene) or BHA (butylhydroxyanisole). In this context, an antioxidant is considered non-natural in case it is not natural according to the appropriate regulations (e.g. food regulations, in case of a food composition).

The combined plant powders of the invention are capable of providing stronger antioxidant efficacy than would be expected on the basis of their individual efficacies. Therefore, the ginger powder, sage powder, and rosemary powder are preferably present as a synergistic combination. That is, they are preferably present in amounts and ratios capable of synergistically providing antioxidant efficacy, rancidity deceleration, shelf life elongation, and/or related benefits. Likewise, if pepper and/or clove is also used, the ginger powder, sage powder, and rosemary powder, and the pepper powder and/or clove powder are preferably present as a synergistic combination. The combination can be a synergistic combination in any type of composition of the invention, although the amounts are typically very different between for example an antioxidant composition and a food composition as described herein. If the composition of the invention is an antioxidant composition, it preferably comprises the ginger powder, sage powder, and rosemary powder, and the optional pepper powder and/or clove powder in ratios in which the combination of plant powders is able to synergistically impart the antioxidant benefits upon its application, preferably upon such application in a product comprising one or more compounds comprising an allylic hydrogen atom and even more preferably in such a product in the form of a food product. Synergies can be established by the method described in Example 1.

Since only relatively small amounts of the plant powders are typically required for these benefits, the combination of plant powders preferably has a relatively neutral flavour profile. That is, it does not have a flavour profile which is too characteristic of any of the individual components. In that way, the combination of plant powders can be used in a variety of food compositions, without an undesired impact on their flavour.

Method

According to a second aspect, the invention relates to a method for improving the oxidative stability of a food composition, wherein the food composition comprises one or more compounds comprising an allylic hydrogen, the method comprising the step of contacting the food composition with
 a) ginger powder,
 b) sage powder, and
 c) rosemary powder;
wherein the particles of the ginger powder have a size of less than 800 μm, and the sage powder and rosemary powder have a size of less than 500 μm; and wherein the ginger powder (G), the sage powder (S), and the rosemary powder (R) are present in a weight ratio of
 G:S:R=1 to 4:1 to 3:1 to 3.

The preferences with regard to plant powders as described for the composition of the invention apply similarly for this method, mutatis mutandis. This applies in particular (but not exclusively) to the compositions, the ratios of the ginger, sage, and rosemary powders and, if present, the pepper and/or clove powders, and their respective particle sizes.

It is preferred that the method is for improving the oxidative stability of a food composition, wherein the food composition comprises at least 0.0001 wt-% (by weight of dry matter), and more preferably from 0.0001 to 85 wt-% of unsaturated lipids and more preferably from 0.5 to 60 wt-% (by dry matter) of oil. More preferably the oil is vegetable oil or chicken fat, and even more preferably vegetable oil.

It is particularly preferred that the method involves contacting the food composition with
 a) ginger powder,
 b) sage powder sourced from *Salvia fruticosa* or *Salvia officinale*,
 c) rosemary powder,
 d) optionally pepper powder sourced from *Piper nigrum*, and
 e) optionally clove powder;
wherein
 the particles of the ginger powder have a size of less than 800 μm, and preferably at least 80 wt-% of the ginger powder has a particle size of less than 0.5 mm;
 the particles of the sage powder, rosemary powder and pepper powder have a size of less than 500 μm and preferably at least 80 wt-% of each of the sage, rosemary and pepper powder has a particle size of less than 0.315 mm;

the particles of the clove powder have a particle size of less than 0.5 mm and preferably at least 50 wt-% of the clove powder has a size of less than 0.315 mm;

and wherein the ginger powder (G), the sage powder (S), and the rosemary powder (R), pepper powder (P), and clove powder (C) are present in a weight ratio of G:S:R:P:C=1.26 to 1.54:0.9 to 1.1:0.9 to 1.1:0.36 to 0.44:0.18:0.22.

In the contacting step, the combination of ginger powder, sage powder, rosemary powder and optionally the pepper powder and/or clove powder preferably constitutes from 0.005 to 5 wt-%, more preferably from 0.01 to 2 wt-%, even more preferably from 0.03 to 1 wt-%, and still more preferably from 0.04 to 0.3 wt-% by weight of dry matter of the composition by weight of dry matter of the composition.

In the method of the invention, it may suffice that at least part of the food composition is contacted with the specified plant powder. Such part is preferably selected such that its amount and composition are suitable to provide the desired oxidative stability to the entire resulting food composition, as is understood by the skilled person.

After the contacting, the combination of plant powders (or part of it) may optionally be separated from the food composition, or it may be left in the composition. Which option is more suitable typically depends on the type of product, its desired taste profile, the desired sensory and rheological properties of the product, etc., to match consumer expectations.

It is preferred that the combination of plant powders remains in contact with the food composition for at least 1 hour, more preferably at least 2 hours, and still more preferably at least 5 hours.

The total amount of the plant powders, their ratios, the contacting time and other process parameters may suitably be optimised to provide the required shelf-life elongation, and/or the required deceleration of oxidation-induced defects. Thus, the method is preferably for providing the food composition with an oxidative stability corresponding to a deceleration factor DF of at least 2, more preferably at least 2.5, still more preferably at least 3, still more preferably at least 3.5.

Use

In a further aspect, the present invention also provides use of a combination of ginger powder, sage powder, and rosemary powder as an antioxidant, a taste and smell protection agent, a rancidity suppression agent and/or a shelf life elongation agent, wherein the particles of the ginger powder have a size of less than 800 μm, and the sage powder and rosemary powder have a size of less than 500 μm; and wherein the ginger powder (G), the sage powder (S), and the rosemary powder (R) are present in a weight ratio of G:S:R=1 to 4:1 to 3:1 to 3.

The use according to the invention preferably relates to use of a combination of ginger powder (G), sage powder (S), rosemary powder (R), pepper powder (P) and clove powder (C) as an antioxidant, a taste and smell protection agent, a rancidity suppression agent and/or a shelf life elongation agent, wherein the particles of the ginger powder have a particle size of less than 800 μm, and the sage powder, rosemary powder, pepper powder and clove powder have a size of less than 500 μm and wherein said powders are present in a weight ratio of G:S:R:P:C=1 to 4:1 to 3:1 to 3:0.4 to 1.2:0.2 to 0.6; preferably G:S:R:P:C=1.26 to 1.54:0.9 to 1.1:0.9 to 1.1:0.36 to 0.44:0.18:0.22.

The specified combination can act as an antioxidant, a taste and smell protection agent, a rancidity suppression agent and/or a shelf life elongation agent, depending on the type of application the combination is used in. It may well have several of these functions simultaneously. In case the combination is used as antioxidant, it is preferably used as a natural antioxidant.

It is particularly preferred that the use is use in a composition also comprising compounds that are sensitive to oxidation. It is even more preferred that this use is use in a composition also comprising a compound comprising an allylic hydrogen. Likewise, it is also preferred that this use is use in a food composition, in particular in a food composition comprising unsaturated lipid, more preferably comprising at least 0.0001 wt-% (by weight of dry matter), and more preferably from 0.0001 to 85 wt-% of unsaturated lipids and more preferably from 0.5 to 60 wt-% (by dry matter) of oil. More preferably the oil is vegetable oil or chicken fat, and even more preferably vegetable oil. In particular, it is preferred that the use is use in a composition comprising mono-unsaturated or poly-unsaturated lipids, to reduce the oxidation rate of these lipids.

Preferred aspects indicated in the context of the first or second aspect of the invention are also applicable to the third aspect of the invention, mutatis mutandis.

Thus, the use is preferably optimised to provide the required shelf-life elongation, and/or the required deceleration of oxidation-induced defects. Thus, the use is preferably in a composition, preferably a food composition, to provide the composition with an oxidative stability corresponding to a deceleration factor DF of at least 2, more preferably at least 2.5, still more preferably at least 3, still more preferably at least 3.5. The use preferably provides a composition with a shelf life of at least 3 months, more preferably at least 6 months, even more preferably at least 9 months, still more preferably at least 12 months, yet more preferably at least 18 months and still yet more preferably at least 24 months. The product preferably obtains such a shelf life without relying on other antioxidants.

EXAMPLES

Example 1

Determination of Antioxidant Activity

The aim of this Example is the determination of antioxidant activities in a savoury model system. The model system comprises an oil that is sensitive to oxidation adsorbed on a quantity of kitchen salt in a way that ensures a large air exposure surface for the oils. The calculation of a deceleration factor of the tested antioxidant is based on accelerated rancidity evaluation by sensory assessment using a scale of level 1-5.

Materials

Commercially available powders of the herbs and spices in Table 1 were used. For each of the powders, the weight percentage of all particles smaller than 0.5 mm, the weight percentage of all particles smaller than 0.315 mm, and the weight percentage of all particles smaller than 0.2 mm are provided, as determined by the method described below.

TABLE 1

| | | Size analysis | | |
|---|---|---|---|---|
| Powder | Botanical name | %-wt <0.5 mm | %-wt <0.315 mm | %-wt <0.2 mm |
| Pepper | *Piper nigrum* L. | 94.2 | 85.5 | 67.4 |
| Sage | *Salvia triloba* L. | 90.2 | 86.1 | 29.5 |
| Clove | *Syzygium aromaticum* L. | 81.3 | 48.8 | 7.6 |

TABLE 1-continued

| Powder | Botanical name | Size analysis | | |
|---|---|---|---|---|
| | | %-wt <0.5 mm | %-wt <0.315 mm | %-wt <0.2 mm |
| Rosemary | *Rosmarinus officinalis* | 97.1 | 95.3 | 27.7 |
| Ginger | *Zingiber officinale* Roscoe | 84.6 | 51.4 | 22.4 |

Non-iodised kitchen salt was used with a particle size distribution (as determined by sieving) such that at least 90 wt-% was between 0.16 mm and 0.8 mm; at most 5 wt-% being larger than 0.8 mm and at most 5 wt-% being smaller than 0.16 mm. The sunflower oil was commercially available as "Thomy reines Sonnenblumend". For each series of samples a new, freshly opened bottle was used.

Powder Blends

The herb and/or spice powders for a particular example were weighed together into an IKA Tube Mill chamber using an analytical balance. The chamber was inserted into the mill and the combination of powders was mixed at 10.000 rμm (30 sec. total mixing time; interval each 5 sec.).

Determination of Particle Size

A representative herb or spice sample is sieved on a sieving machine through a series of sieves (20 cm) assembled according to increasing nominal aperture size from bottom to top, equipped with receiver (bottom) and lid. Commercially available test sieves are used with appropriate nominal aperture size. Suitable nominal aperture sizes are given in DIN ISO 3310-1:1990 or ISO 565:1990. For each measurement, 100 gram of sample material is weighted with an accuracy of 0.1 gram into the sieve at the top of the nest. After putting the lid on the nest of the sieves it is transferred onto the laboratory sieving machine (vibratory screening machine) and sieved for 10 minutes (amplitude 2 mm; sieving aid: two stainless steel balls). After completion of the 10 minutes, the retained fraction of each sieve is weighed on an analytical balance to an accuracy of 0.1 g. Each sieve charge is calculated as percentage of mass to one decimal place by dividing the residue (g) by the sample amount (100 g) and multiplying by 100.

Determination of Dry Matter Content

The water content and corresponding dry matter content of the plant powders used herein was determined by the following method, wherein the dry matter content is the residual mass after drying the sample expressed as %. For each measurement, 5 g (with 0.1 mg accuracy) of sample material (e.g. homogenized dry herb/spice) is weighed into a pre-dried, tared pan containing about 60 g of pre-dried sea sand and mixed well. The pan with the sample is dried for 6 hours in a vacuum oven at 0.1 bar and 72° C. After 6 hours the pan is placed in a desiccator and allowed to cool down to ambient temperature (30-45 min). Then, it is weighed (with 0.1 mg accuracy). Duplicate determinations of each sample are carried out. Water content, given in percent with two decimal places, is calculated by dividing the measured amount of water (mg) by the sample amount (mg) and multiplying by 100. The lower limit of quantification is 0.01 g/100 g for homogeneous samples. The method uncertainty (95%, k=2) for the determination of the water content of is 1.2% relative. The given uncertainty is valid for representative sampling and sample matrix "dry herbs and spices".

Preparation of Test Samples

The sum of all ingredients for each sample is set at 100.0 g and the amount of oil was always set at 1.00 g. Thus, the amount of salt was adapted accordingly. The calculated amount of salt was weighed into a mortar using a laboratory balance (accuracy 0.01 g). Subsequently, the required amount of the powder blend was weighed into a weighing boat with the aid of an analytical balance (accuracy 0.0001 g) and added to the salt. The resulting mixture was homogenized with a pestle until the mixture was visually homogeneous. Then 1.00 gram of sunflower oil was added to the mixture in the mortar with a pipette and homogenized with a pestle for 1 minute. Subsequently, the total amount was transferred to a 300 ml Erlenmeyer flask. All examples were prepared and tested in duplicate. For each series of samples, two control samples were prepared at the same time and in the same way as the samples, except that no powder blend was added. Before and between testing, the Erlenmeyer flasks containing the samples were stored at 30° C. for acceleration. The model system was representative for typical dry savoury compositions, including those in which a modest amount of oil is used for anti-dust purposes.

Nasal Sniffing

The accelerated samples for nasal sniffing were examined at 1-day intervals by a trained sniffing panel (3-5 members). Each panel member individually assigned a rancidity level to each sample, using a validated five-level scale as detailed in Table 2. Sunflower oil from a freshly opened bottle was used as a reference. Sample temperature for sniffing was 20° C.

TABLE 2

| Rancidity levels | | |
|---|---|---|
| Level | Rancidity descriptions | Comparison to reference |
| 1 | rancidity not detectable | equal to reference |
| 2 | rancidity detectable | moderately different |
| 3 | clear rancidity | distinctly different |
| 4 | strongly rancid, inedible | strongly different |
| 5 | tainted, not consumable | extremely different |

Calculation of the Deceleration Factor

For each sample (including the control sample) in a test series, the time was monitored in days until the highest rancidity level was perceived (level 5). The rancidity development time reported for a particular composition was the average of the two duplicate samples. The deceleration factor (DF) for a particular sample was defined as the quotient of the rancidity development time of that sample divided by the rancidity development time of the corresponding control sample:

$$DF(sample) = RDT(sample)/RDT(control)$$

Extensive testing of this test method, yielded a method uncertainty for DF of 0.2.

Demonstration of Synergistic Efficacy

In order to demonstrate the synergistic antioxidant interactions between ginger, sage, and rosemary (and optionally the black pepper and clove), a series of 27 test sample compositions (salt/oil/powder blends as detailed above) and a blank sample was prepared to build a model using the JMP software package and 6 further sample compositions were prepared to validate the model. The composition of the 27 samples was selected using the "Design of Experiment" functionality of JMP. The concentrations of the herbs and spices in the 33 test samples was varied within the ranges summarised in Table 3.

TABLE 3

| Powder | Concentration range (wt-%) |
|---|---|
| Ginger | 0-0.140 |
| Sage | 0-0.100 |
| Rosemary | 0-0.100 |
| Pepper | 0-0.040 |
| Clove | 0-0.020 |

Deceleration factors of up to 30.8 were obtained, demonstrating the antioxidant activity of powder blends according to the present invention. Thus, good antioxidant efficacy was observed with ginger (G):sage (S):rosemary (R) weight ratios within the range of G:S:R=1 to 3:1 to 3:1 to 3. Even better efficacy was observed when ginger, sage, and rosemary powders were present in weight ratios within the range of G:S:R=1.26 to 1.54:0.9 to 1.1:0.9 to 1.1. Excellent efficacy was observed when ginger (G), sage (S), rosemary (R), black pepper (P) and clove (C) powders were present in weight ratios within the range of G:S:R:P:C=1.26 to 1.54:0.9 to 1.1:0.9 to 1.1:0.36 to 0.44:0.18:0.22.

Using JMP it was possible to establish and validate a model based on the deceleration factors for the above set of test samples. The model was able to detect both direct antioxidant activity and synergistic interactions as detailed in Table 4, based on significant correlations of the deceleration factor DF with individual concentrations or with binary interactions, respectively.

TABLE 4

| Direct antioxidant contribution? (Yes/No) | |
|---|---|
| Ginger | YES |
| Sage | YES |
| Rosemary | YES |
| Pepper | YES |
| Clove | YES |
| Synergistic interaction? (Yes/No) | |
| Ginger * Sage[a] | YES |
| Ginger * Rosemary[a] | YES |
| Sage * Rosemary[a] | YES |
| Black pepper * Ginger | YES |

[a]Ginger, Sage and Rosemary form a synergistic triangle

Thus the present example demonstrates that combinations of ginger powder, sage powder and rosemary powder were capable of significantly extending the shelf life of model compositions by delaying the development of rancidity due to their synergistic antioxidant activity. The antioxidant activity could be further enhanced by using black pepper and clove.

Example 2

In this example the effect of the combination of herb and spice powders according to the invention was demonstrated in a typical wet product format.

Materials

Water: demineralised water.

Rapeseed oil ex Cargill (Amsterdam, The Netherlands).

Sugar: sucrose white sugar W4 ex Suiker Unie (Oud Gastel, Netherlands).

Salt: NaCl suprasel ex Akzo Nobel (Amersfoort, Netherlands).

EDTA: Ethylenediaminetetraacetic acid, calcium disodium complex, dehydrate; Dissolvine E-CA-10 ex Akzo Nobel (Amersfoort, Netherlands).

Egg yolk: ex Bouwhuis Enthoven (Raalte, the Netherlands); contains 92% egg yolk and 8% kitchen salt.

Vinegar spirit 12% ex. Kühne (Hamburg, Germany)

Spice mix extract: combination of ginger powder (G), sage powder (S), rosemary powder (R), pepper powder (P), and clove powder (C) in a weight ratio of G:S:R:P:C=1.26 to 1.54:0.9 to 1.1:0.9 to 1.1:0.36 to 0.44:0.18:0.22. The same ginger, sage, rosemary, pepper, and clove powders were used as in Example 1.

Mayonnaise Preparation

High oil mayonnaise samples were produced at 1 kg scale by first preparing an aqueous phase, composed of water, egg yolk, sucrose, salt, flavour, spice mix and EDTA, as applicable. Subsequently oil was slowly added to the aqueous phase, while mixing with a high shear mixer (Silverson). The oil was added in about 10 minutes, while the mixing speed was slowly increased from about 1600 to about 7200 rpm. After the oil had been homogenised, spirit vinegar was slowly added while the mixer was kept at 7200 rpm. The pH of the mayonnaises after acidification was 3.8.

In this way, four mayonnaise samples were prepared according to the recipes reported in Table 5. Samples of mayonnaise with (S1) and without EDTA (S2) were used as positive and negative reference, respectively.

TABLE 5

Composition of the mayonnaise samples tested in this study.

| | Mayonnaise sample | | | |
|---|---|---|---|---|
| Ingredient | S1 | S2 | S3 | S4 |
| Demineralized water | To 100% | To 100% | To 100% | To 100% |
| EDTA | 0.0075% | — | — | — |
| Rapeseed oil | 75% | 75% | 75% | 75% |
| Sucrose | 1.3% | 1.3% | 1.3% | 1.3% |
| Salt | 1.03% | 1.03% | 1.03% | 1.03% |
| Spirit vinegar | 2.6% | 2.6% | 2.6% | 2.6% |
| Egg yolk | 5.2% | 5.2% | 5.2% | 5.2% |
| Flavour | 0.3% | 0.3% | 0.3% | 0.3% |
| Spice mix | — | — | 0.05% | 0.1% |

Sensory Evaluation

A storage test under standard conditions (20° C.) was performed. Immediately after production, each mayonnaise formulation was packed into glass jars and stored at 20° C., in the dark. At intervals of 1 month, the jars were submitted to the sensory evaluation of a panel. The only attribute that was scored was "oxidation". The scoring system was based on a 3-point scale, where 1 indicated a fresh sample and 3 an oxidized one.

TABLE 6

Sensory scores of mayonnaise samples stored under standard non-accelerated conditions (20° C.).

| Mayonnaise sample | Storage time [days] | | | |
|---|---|---|---|---|
| | 0 | 30 | 60 | 90 |
| S1 | 1 | 1 | 2 | 1 |
| S2 | 1 | 3 | — | — |
| S3 | 1 | 1.5 | 1 | 1 |
| S4 | 1 | 1 | 1 | 1 |

Table 6 shows that after 3 months of storage at 20° C., the samples containing the spice mix (S3 and S4) still scored similar to the positive reference (S1) in terms of oxidation. This implies that no perceivable off-flavour was formed over the indicated period of time. This result is particularly remarkable considering that a mayonnaise sample without EDTA (negative reference) developed off-notes already within one month of storage at 20° C.

Example 3

A further set of examples was prepared and analysed using the same materials and following the same procedures as in Example 1, but with the herb/spice contents according to Table 7. The high deceleration factors observed for the examples containing all three herbs/spices demonstrate the synergistic deceleration of rancidity by combinations of ginger, sage, and rosemary particles.

TABLE 7

|  | Ginger (wt-%) | Sage (wt-%) | Rosemary (wt-%) | Deceleration Factor |
|---|---|---|---|---|
| 3:1 | 0.35 | 0.25 | 0.25 | 3.7 |
| 3:2 | 0.07 | 0.05 | 0.05 | 20.8 |
| 3:3 | — | 0.025 | 0.025 | 2.8 |
| 3:4 | 0.035 | — | 0.025 | 2.3 |
| 3:5 | 0.035 | 0.025 | — | 2.2 |
| 3:6 | — | — | 0.025 | 1.8 |
| 3:7 | — | 0.025 | — | 1.7 |
| 3:8 | 0.035 | — | — | 1.2 |

The invention claimed is:

1. A composition comprising
a) ginger powder (G),
b) sage powder (S), and
c) rosemary powder (R);
wherein particles of the ginger powder (G) have a size of less than 800 μm, and the sage powder (s) and the rosemary powder (R) have a particle size of less than 500 μm;
and wherein the ginger powder (G), the sage powder (S), and the rosemary powder (R) are present in a weight ratio of
G:S:R=1.26 to 1.54:0.9 to 1.1:0.9 to 1.1.

2. The composition according to claim 1 wherein the ginger powder (G), the sage powder (S), and the rosemary powder (R) are present in a weight ratio of
G:S:R=1.33 to 1.47:0.95 to 1.05:0.95 to 1.05.

3. The composition according to claim 1 wherein the ginger powder (G), the sage powder (S) and the rosemary powder (R) have a particle size of less than 315 μm.

4. The composition according to claim 1, also comprising pepper powder (P), wherein the pepper powder (P) has a particle size of less than 500 μm.

5. The composition according to claim 4, wherein the ginger powder (G), the sage powder (S), the rosemary powder (R), and the pepper powder (P) are present in a weight ratio of
G:S:R:P=1.26 to 1.54:0.9 to 1.1:0.9 to 1.1:0.4 to 1.2.

6. The composition according to claim 1, also comprising clove powder (C), wherein the clove powder (C) has a particle size of less than 500 μm.

7. The composition according to claim 6, wherein the ginger powder (G), the sage powder (S), the rosemary powder (R), and the clove powder (C) are present in a weight ratio of
G:S:R:C=1.26 to 1.54:0.9 to 1.1:0.9 to 1.1:0.2 to 0.6.

8. The composition according to claim 6, wherein the ginger powder (G), the sage powder (S), the rosemary powder (R), the pepper powder (P), and the clove powder (C) are present in a weight ratio of
G:S:R:P:C=1.26 to 1.54:0.9 to 1.1:0.9 to 1.1:0.4 to 1.2:0.2 to 0.6.

9. An antioxidant composition according to claim 1, comprising the ginger powder (G), the sage powder (S), the rosemary powder (R) and, if present, pepper powder (P) and/or clove powder (C) in a total amount of at least 50 percent by weight of the composition.

10. A food composition according to claim 1, comprising the ginger powder (G), the sage powder (S), the rosemary powder (R) and, if present, pepper powder (P) and/or clove powder (C) in a total dry amount of from 0.005 to 5 percent by weight of dry matter of the composition.

11. The food composition according to claim 10, also comprising one or more compounds comprising an allylic hydrogen atom.

12. The food composition according to claim 10, comprising one or more unsaturated lipids.

* * * * *